(12) United States Patent
Han et al.

(10) Patent No.: US 8,908,119 B2
(45) Date of Patent: Dec. 9, 2014

(54) MOLD FRAME AND LIQUID CRYSTAL DISPLAY DEVICE USING THE SAME

(75) Inventors: Ho-Seok Han, Yongin (KR); Seung-Gyun Woo, Yongin (KR); Sang-Hoon Shin, Yongin (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 653 days.

(21) Appl. No.: 13/051,412

(22) Filed: Mar. 18, 2011

(65) Prior Publication Data

US 2011/0234937 A1 Sep. 29, 2011

(30) Foreign Application Priority Data

Mar. 24, 2010 (KR) ........................ 10-2010-0026263

(51) Int. Cl.
*G02F 1/1333* (2006.01)
*G02F 1/1345* (2006.01)

(52) U.S. Cl.
CPC ............. *G02F 1/133308* (2013.01); *G02F 2001/133317* (2013.01); *G02F 1/13452* (2013.01); *G02F 2001/133322* (2013.01)
USPC .............. 349/58; 349/150; 349/152

(58) Field of Classification Search
CPC .......... G02F 1/133308; G02F 2001/133322; G02F 2001/133317; G02F 1/13452
USPC ............ 349/58, 60, 149, 150, 151, 152; 361/679.21, 679.22, 679.26
See application file for complete search history.

(56) References Cited

U.S. PATENT DOCUMENTS

| | | | |
|---|---|---|---|
| 5,499,446 A * | 3/1996 | Murakami | 29/852 |
| 2004/0183959 A1 | 9/2004 | Ishida | |
| 2006/0152664 A1* | 7/2006 | Nishio et al. | 349/150 |
| 2008/0284937 A1 | 11/2008 | Jang et al. | |

FOREIGN PATENT DOCUMENTS

| | | |
|---|---|---|
| CN | 1532608 A | 9/2004 |
| JP | 59-198487 A | 11/1984 |
| JP | 2004-286911 A | 10/2004 |
| KR | 2001-0000907 U | 1/2001 |
| KR | 10-2005-0080358 A | 8/2005 |
| KR | 10-0701083 B1 | 3/2007 |
| KR | 10-2008-0101275 A | 11/2008 |
| TW | 200809311 | 2/2008 |
| TW | 200824516 | 6/2008 |

OTHER PUBLICATIONS

Extended European Search Report dated Jun. 10, 2011 for European Patent Application No. EP 11 158487.6 which shares priority of Korean Patent Application No. KR 10-2010-0026263 with captioned U.S. Appl. No. 13/051,412.
Chinese Office Action dated Jun. 24, 2013 for Chinese Patent Application No. CN 201110069572.1 which shares priority of Korean Patent Application No. KR 10-2010-0026263 with captioned U.S. Appl. No. 13/051,412.
Taiwan Office Action dated Nov. 21, 2013 for Taiwan Patent Application No. TW 100109524, which shares priority of Korean Patent Application No. KR 10-2010-0026263 with captioned U.S. Appl. No. 13/051,412.

* cited by examiner

*Primary Examiner* — Dung Nguyen
*Assistant Examiner* — Tai Duong
(74) *Attorney, Agent, or Firm* — Knobbe, Martens, Olson & Bear, LLP (57) ABSTRACT

A mold frame for a liquid crystal display is disclosed. In one embodiment, the mold frame includes a plurality of supporting portions formed in a plurality of sides of the mold frame, respectively, and configured to receive and support a backlight module. The mold frame further includes an opening portion formed in another different side of the mold frame, wherein the opening portion is connected to at least two of the supporting portions; and a protruding portion extending from the opening portion.

16 Claims, 6 Drawing Sheets

MOLD FRAME AND LIQUID CRYSTAL DISPLAY DEVICE USING THE SAME

CROSS-REFERENCE TO RELATED APPLICATION

This application claims priority to and the benefit of Korean Patent Application No. 10-2010-0026263, filed on Mar. 24, 2010, in the Korean Intellectual Property Office, the entire content of which is incorporated herein by reference.

BACKGROUND

1. Field

The described technology generally relates to a liquid crystal display device, and more specifically, to a mold frame which effectively reduces an external impact and a liquid crystal display device using the same 2. Discussion of the Related Technology Recently, a liquid crystal display has been remarkably developed with the advance of semiconductor technology. The liquid crystal display has been mainly used due to advantages such as slimness, lightweight and low power consumption.

SUMMARY

One aspect is a mold frame for protecting a printed circuit board by effectively reducing external impact thereon and a liquid crystal display device using the same.

Another aspect is a mold frame receiving a backlight module, the mold frame including: a supporting part that covers a first side and left and right sides of the backlight module; an opening part that is provided in a direction corresponding to a second side of the backlight module; and a protruding part that is positioned at one region of the opening part.

Further, the height of the protruding part is the same as the height of the supporting part.

Another aspect is a liquid crystal display device including: a liquid crystal display panel; a driver IC that transfers a signal driving the liquid crystal display panel; a printed circuit board that transmits a signal to the driver IC; a backlight module that is positioned on the lower portion of the liquid crystal display panel and transmits light to the liquid crystal display panel; and a mold frame that receives the backlight module and includes an opening part formed at a region corresponding to the printed circuit board and a protruding part formed at one region of the opening part, wherein the region of the printed circuit board overlapping with the protruding part is formed with a penetrating part through which the protruding part penetrates.

Further, the mold frame includes a supporting part that covers a first side and left and right sides of the backlight module; an opening part that is provided in a direction corresponding to a second side of the backlight module; and a protruding part that is positioned at one region of the opening part.

Further, the height of the protruding part is the same as the height of the supporting part. Further, the penetrating part is formed in a form of a hole or a bent part.

Further, the liquid crystal display panel is formed with a terminal part that is connected with the driver IC, the terminal part being formed in the region other than a position opposite to the penetrating part.

Further, the penetrating part is formed in a form of a hole or a bent part. Further, the height of the protruding part is formed to be higher than the height of the driver IC. Further, the printed circuit board is an FPC.

Another aspect is a mold frame for a liquid crystal display, the mold frame comprising: a plurality of supporting portions formed in a plurality of sides of the mold frame, respectively, and configured to receive and support a backlight module; an opening portion formed in another different side of the mold frame, wherein the opening portion is connected to at least two of the supporting portions; and a protruding portion extending from the opening portion.

In the above frame, the height of the protruding portion is substantially the same as the height of at least one of the supporting portions. In the above frame, the protruding portion is substantially less in width than that of each of the supporting portions. In the above frame, the protruding portion is formed adjacent to the center of the different side where the opening portion is formed.

Another aspect is a liquid crystal display comprising: a liquid crystal display panel; a driver integrated circuit (IC) configured to supply a driving signal to the liquid crystal display panel; a printed circuit board configured to transmit the driving signal to the driver IC, wherein a recess is formed in the printed circuit board; a backlight module formed below the liquid crystal display panel and configured to provide light to the liquid crystal display panel; and a mold frame configured to receive the backlight module, wherein the mold frame comprises a protruding portion which extends toward the liquid crystal display panel, and wherein the protruding portion of the mold frame is configured to at least partially penetrate the recess of the printed circuit board.

In the above display, the mold frame comprises: a plurality of supporting portions formed in a plurality of sides of the mold frame, respectively, and configured to receive and support a backlight module; and an opening portion formed in another different side of the mold frame, wherein the opening portion is connected to at least two of the supporting portions, and wherein the protruding portion is formed on the opening portion.

In the above display, the height of the protruding portion is substantially the same as the height of at least one of the supporting portions. In the above display, the recess includes a hole or a non-linear portion. In the above display, the non-linear portion has a curved shape. In the above display, the non-linear portion has a semi-circular shape.

The above display further comprises a terminal portion interconnecting the driver IC and printed circuit board, wherein the terminal portion is not formed in the region which directly faces the recess of the printed circuit board. In the above display, the height of the protruding portion is greater than the height of the driver IC. In the above display, the printed circuit board is a flexible printed circuit (FPC).

Another aspect is a liquid crystal display comprising: a liquid crystal display panel; a backlight module formed below the liquid crystal display panel and configured to provide light to the liquid crystal display panel; and a mold frame configured to receive the backlight module, wherein the mold frame has a plurality of sides, wherein a first recess is formed in one of the sides, wherein a protrusion is formed on the recessed portion and extends toward the liquid crystal display panel, and wherein the width of the protrusion is significantly less than that of each of the sides.

In the above display, the plurality of sides comprise four sides, and wherein three sides are non-recessed and have substantially the same height. In the above display, the plurality of sides comprise two short sides and two long sides, and wherein the first recess is formed in one of the two short sides. In the above display, the height of the protrusion is substantially the same as the height of the sides where the protrusion is not formed.

The above display further comprises: a printed circuit board configured to provide a driving signal to the liquid crystal display panel, wherein a second recess is formed in the printed circuit board, wherein the second recess is significantly less in size than the first recess, and wherein the protrusion of the mold frame is configured to at least partially penetrate the second recess of the printed circuit board. In the above display, the second recess includes a hole or a non-linear portion. In the above display, the non-linear portion has a curved shape.

DETAILED DESCRIPTION

The liquid crystal display includes i) a liquid crystal panel, ii) a driver IC that generates signals and transfers them to a pixel unit iii) a backlight module that provides light to the liquid crystal panel and iv) a mold frame that receives and fixes components such as a light guide plate sheet. The backlight module provides light, received from the driver IC, to the liquid crystal panel to display images. The backlight module includes a sheet and a lamp which diffuse and collect light. The mold frame includes a supporting part having a predetermined height in order to reduce an external impact to be transferred to other components such as the light guide plate sheet.

In addition, the liquid crystal display includes a printed circuit board which interconnects the driver IC and an external device to transfer the external signals to the driver IC. The supporting part of the mold frame is not formed at a portion where the printed circuit board is coupled with the driver IC so that the printed circuit board can be connected with the driver IC.

The liquid crystal display device can be affected by impact which occurs during an impact test or in use. Since the supporting part of the mold frame is not formed at a portion where the printed circuit board is coupled with the driver IC, the impact is directly transferred to and can damage the driver IC and the printed circuit board.

In the following detailed description, only certain exemplary embodiments have been shown and described, simply by way of illustration. As those skilled in the art would realize, the described embodiments may be modified in various different ways. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments will be described with reference to the accompanying drawings.

Figure 1:
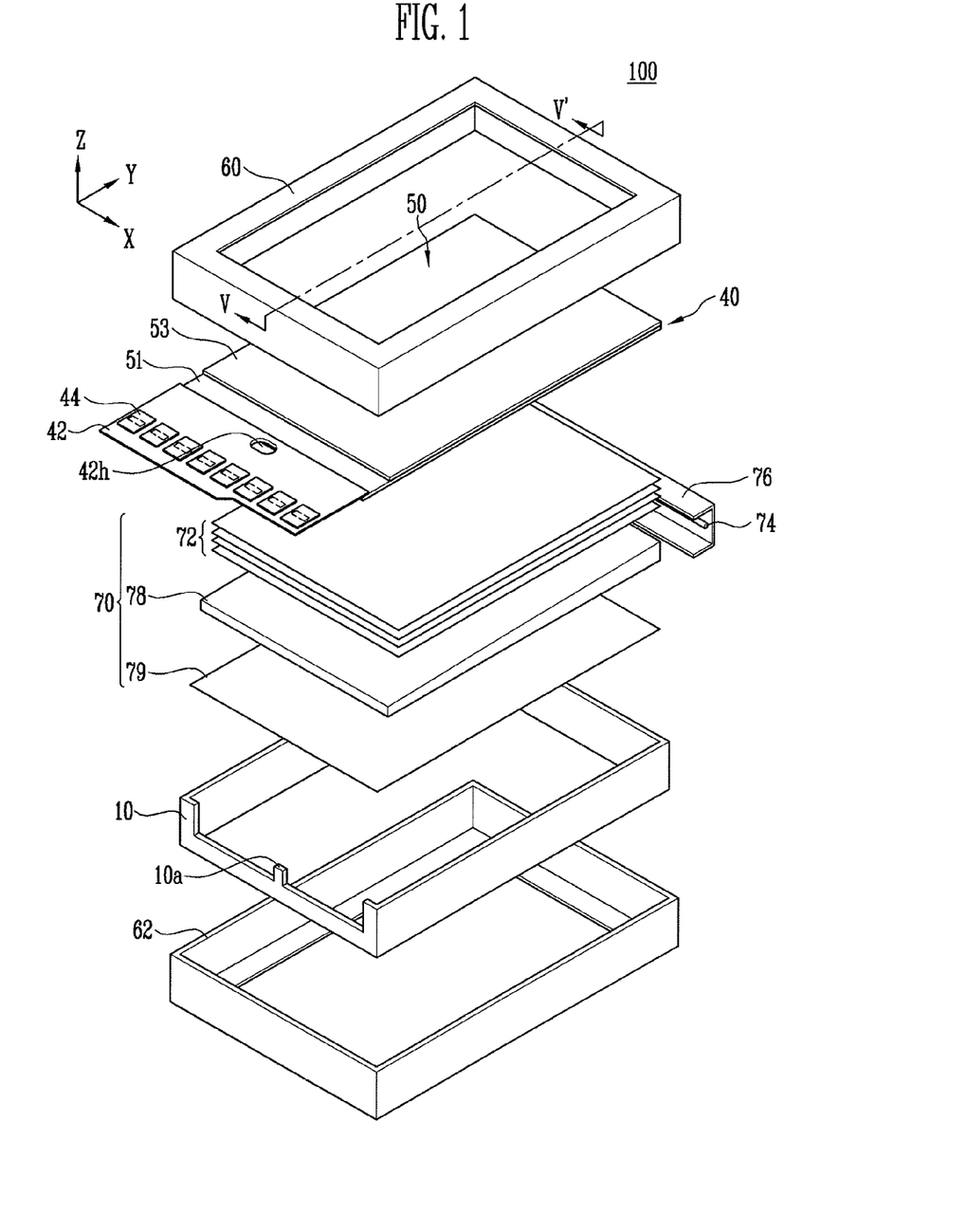
FIG. 1 is an exploded perspective view of a liquid crystal display device according to an embodiment.
Figure 2:
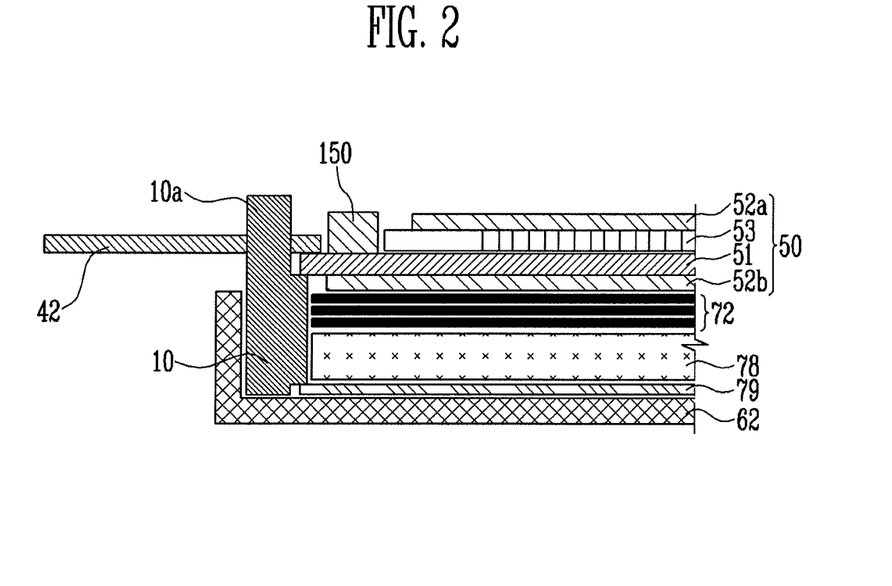
FIG. 2 is a cross-sectional view taken along V-V' of the liquid crystal display device shown in FIG. 1.

FIG. 1 is an exploded perspective view of a liquid crystal display device according to an embodiment. FIG. 2 is a cross-sectional view taken along V-V' of the liquid crystal display device shown in FIG. 1. Referring to FIGS. 1 and 2, a liquid crystal display device 100 includes a backlight module 70 that transmits light and a liquid crystal display panel module 40 that displays images based on the received light. Further, the device 100 includes a top chassis 60, a bottom chassis 62, and a mold frame 10, which accommodate the backlight module 70 and the panel module 40.

The backlight module 70 is supported by the lower bottom chassis 62 and is received and fixed in the mold frame 10. The backlight module 70 includes i) a lamp 74 that emits light and is formed in a lamp cover 76, ii) a light guide plate 78 that guides and supplies light emitted from the lamp, and iii) a reflective sheet 79 that is positioned on the lower portion of the light guide plate 78 and reflects light. In addition, an optical sheet 72 is formed on the upper portion of the light guide plate 78. The lamp 74 can be a light emitting diode and other light sources, for example, a surface light source or a line light source. In one embodiment, the mold frame 10 includes four sides. Each of the first three sides of the mold frame 10 has a supporting part (or a plurality of supporting portions formed in the three sides) The remaining side of the mold frame 10 with which the printed circuit board is coupled does not have a supporting portion so that the printed circuit board 42 is easily coupled to the mold frame 10. In one embodiment, in order to prevent the damage due to impact transferred from the outside of the liquid crystal display device, the remaining side of the mold frame 10 has a protruding part 10a. In one embodiment, protruding part 10a absorbs an external impact in conjunction with a penetrating part of the printed circuit board 42 (will be described below in more detail). In this embodiment, the external impact is not transferred to the printed circuit board 42 and/or the driver IC, thereby making it possible to protect the printed circuit board 42 and/or the driver IC.

The liquid crystal display module 40 includes a liquid crystal display panel 50, a driver IC 150 (see FIGS. 3B-4B), and the printed circuit board 42. The liquid crystal display panel 50 may include i) a TFT substrate 51 on which a thin film transistor is formed, ii) a color filter substrate 53 that is positioned on the upper portion of the TFT substrate 51, and iii) liquid crystal (not shown) that is injected between the two substrates 51 and 53. The upper portion of the color filter substrate 53 and the lower portion of the TFT substrate 51 may be attached with a polarizer 52a/52b (See FIG. 2) to determine a polarizing direction of visible radiation emitted from the backlight module 70.

In one embodiment, the TFT substrate 51 is formed on a transparent substrate in a matrix form. A source is connected to a data line and a drain is connected to a pixel electrode formed of, for example, a conductive material such as ITO. A gate is connected to a scan line to determine the on and off states of the TFT based on a scan signal, provided through the scan line, so as to transfer electrical signals from the source to the drain. The array of the liquid crystal is changed by the electrical signal to determine the transmittance of light.

The color filter substrate 53 allows light, which passes through the liquid crystal, to realize specific colors. A gray scale of an image to be displayed is determined according to the transmittance.

The printed circuit board 42 transfers the data signal and the scan signal to the TFT substrate 51. A controller 44 transfers the signals to the driver IC through the printed circuit board 42. In one embodiment, the printed circuit board 42 includes a penetrating part through which the protruding portion 10a partially or fully extends. In one embodiment, the protruding portion 10a does not contact the penetrating part and the remaining portion of the printed circuit board. In one embodiment, the penetrating part is a hole 42h (FIG. 3B) or a bent part 42c (FIG. 3C). In one embodiment, the penetrating part is any other non-linear portion which may have a curved shape such as a semi-circular shape, as long as it allows the protruding portion 10a to at least partially penetrate or pass through the penetrating part. In one embodiment, the printed circuit board 42 is a flexible printed circuit (FPC).

Figure 3A:
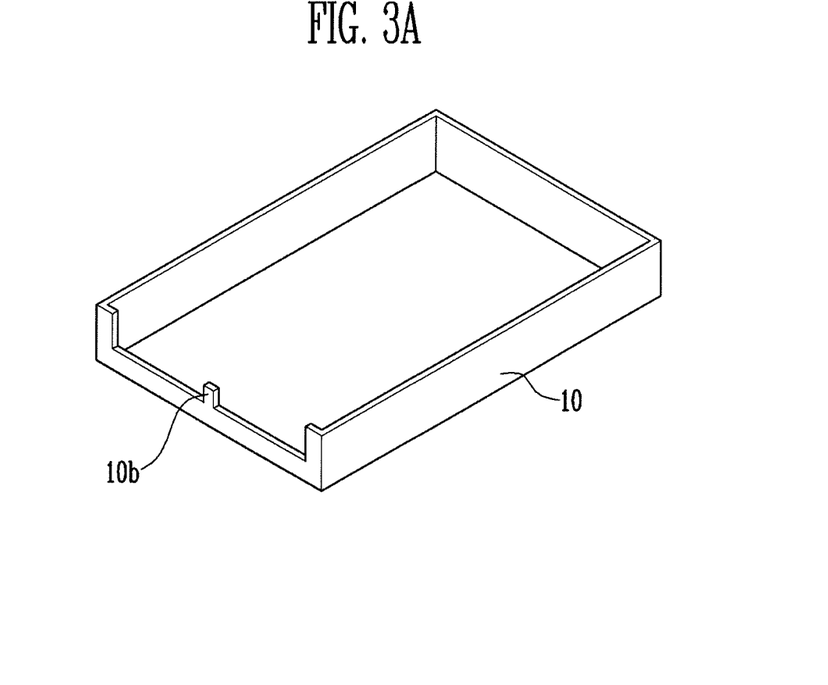
FIG. 3A is a perspective view of a mold frame shown in FIG. 1.
Figure 3B:
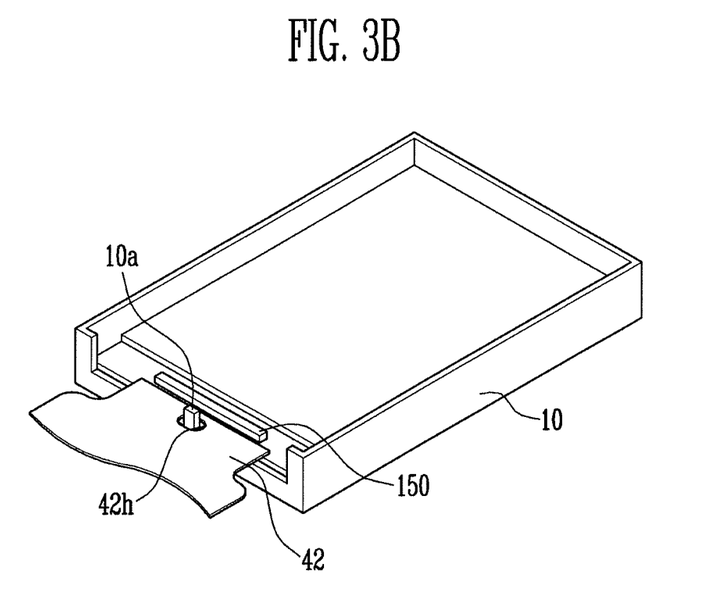
FIG. 3B is a perspective view showing a first embodiment where the printed circuit board is connected with the mold frame.
Figure 3C:
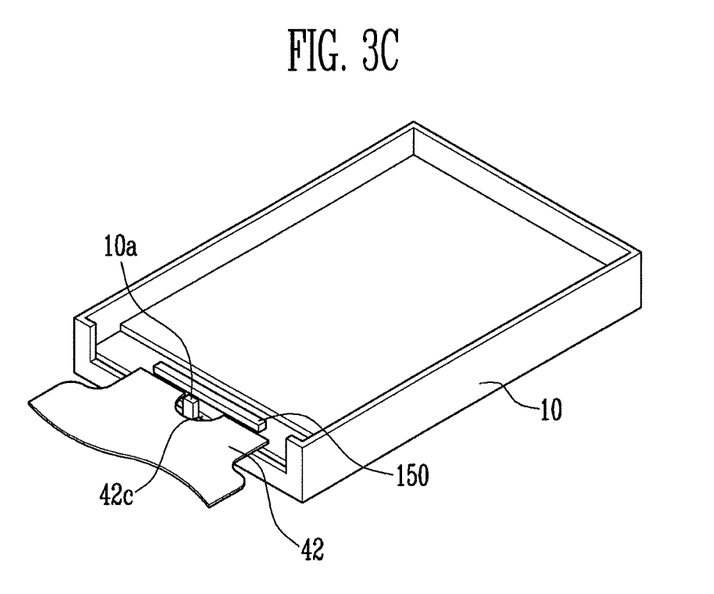
FIG. 3C is a perspective view showing a second embodiment where the printed circuit board is connected with the mold frame.

FIG. 3A is a perspective view of the mold frame shown in FIG. 1. FIG. 3B is a perspective view showing the first embodiment where the printed circuit board is connected with the mold frame. FIG. 3C is a perspective view showing a second embodiment where the printed circuit board is connected with the mold frame.

In one embodiment, in order to prevent the damage of the printed circuit board 4 and/or the driver IC 150, the side not having the supporting part of four sides of the mold frame is provided with the protruding part 10a. When the impact is transferred from the outside of the device, the impact is transferred only or primarily to the protruding part 10a, such that' it is not transferred to the printed circuit board 42 and/or the driver IC 150, since the protruding portion 10a at least partially penetrates or passes through the penetrating part without contacting the printed circuit board 42. As shown in FIGS. 1 and 3A-3C, the mold frame includes a single protruding portion 10b which extends toward the liquid crystal display panel 50. The protruding portion 10b of the mold frame can at least partially penetrate the recess 42h or 42c of the printed circuit board 42 as shown in FIGS. 3B and 3C. The mold frame includes first and second sides (e.g., shorter sides of the mold frame) opposing each other. As shown in FIG. 3A, the single protruding portion 10b is integrally formed on the first side. As shown in FIGS. 1 and 3A-3C, the single protruding portion 10b has a thickness the same as that of the first side of the mold frame. Here, the thickness is measured in a direction extending from the first side to the second side of the mold frame.

Figure 4A:
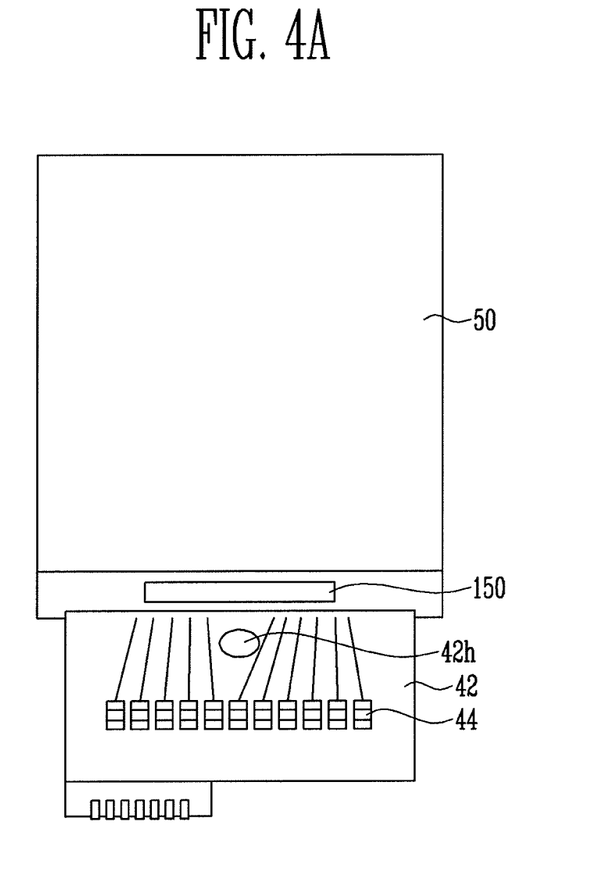
FIG. 4A is a plan view showing the first embodiment where the printed circuit board shown in FIG. 1 is coupled with a substrate.
Figure 4B:
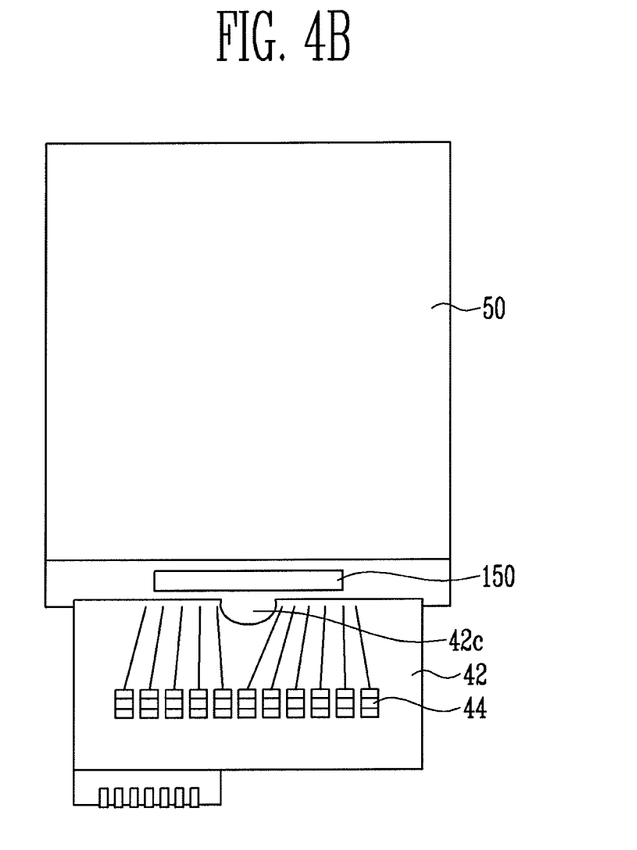
FIG. 4B is a plan view showing the second embodiment where the printed circuit board shown in FIG. 2 is coupled with a substrate.

FIG. 4A is a plan view showing the first embodiment where the printed circuit board shown in FIG. 1 is coupled with a substrate. FIG. 4B is a plan view showing the second embodiment where the printed circuit board shown in FIG. 2 is coupled with the substrate. Referring to FIGS. 4A and 4B, the upper side of the substrate is provided with the liquid crystal display panel 50 on which the pixels are formed to display images. Further, the lower side of the substrate is provided with the driver IC 150 that transfers the signals to the data line, etc. The lower portion of the driver IC 150 is coupled with the printed circuit board 42 that transfers the signals to the driver IC 150. In one embodiment, in order to avoid the interference with the hole 42h or the bent part 42c, the wiring of the printed circuit board 42 are not formed at the portion where the hole 42h or the bent part 42c is formed. The controller 44 transferring the signals is formed on the printed circuit board 42.

Figure 5A:
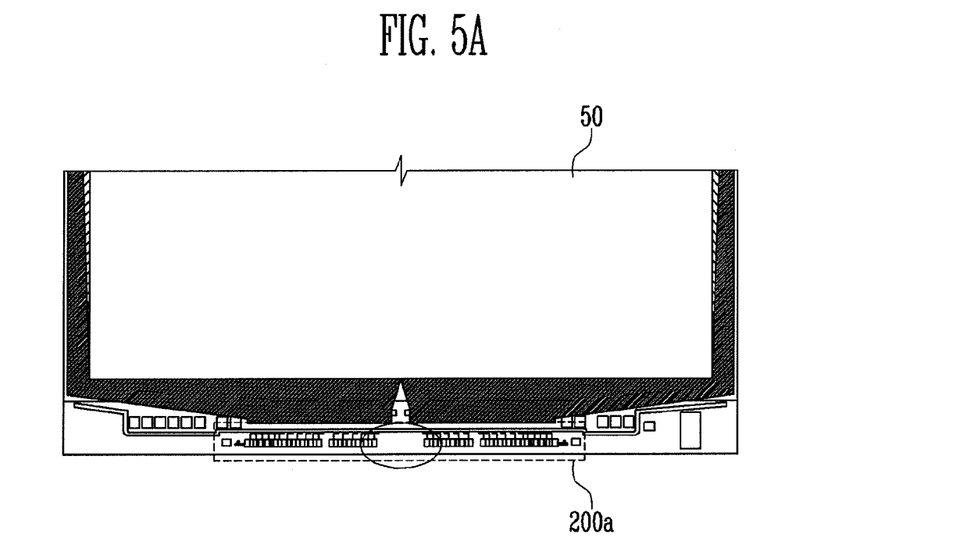
FIG. 5A is a plan view showing the printed circuit board shown in FIG. 1 and the substrate coupled with the printed circuit board.
Figure 5B:
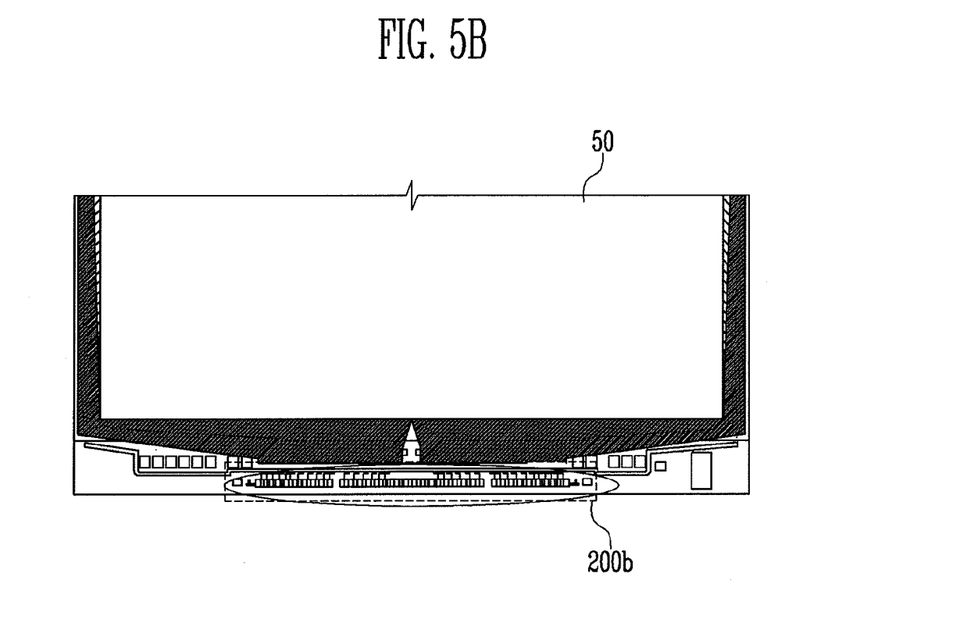
FIG. 5B is a plan view showing a general printed circuit board and a substrate coupled with the printed circuit board.

FIG. 5A is a plan view showing the printed circuit board 42 shown in FIG. 1 and the substrate coupled with the printed circuit board 42. FIG. 5B is a plan view showing a general printed circuit board and a substrate coupled with the printed circuit board. Referring to FIGS. 5A and 5B, a terminal 200a is formed on the lower side of the substrate. The wiring of printed circuit board 42 receive the signals from the driver IC 150 and transfer the received signals to pixel units. The terminal 200a, coupled with the driver IC 150 and the printed circuit board 42, transfers the signals received from the printed circuit board 42 to the driver IC 150.

In one embodiment, the wiring of the printed circuit board 42 is formed in the area where the hole 42h or the bent part 42c is not formed on the printed circuit board 42. In one embodiment, the terminal 200a is formed on the substrate and formed in a region other than a position corresponding the hole 42h or the bent part 42c on the printed circuit board 42. In one embodiment, as shown in FIG. 5B, the terminal 200a forms a space at the central portion. The space is to avoid or minimize voltage drop arising from the difference in line resistance which may occur due to the difference in length between the wiring connected to the outside of the terminal 200b and the wiring connected to the central portion thereof.

According to at least one embodiment, the protruding part is formed at the mold frame of the portion where the printed circuit board and the driver IC are connected with each other. As a result, when the impact is transferred, it is transferred to the protruding part so as not to be transferred to the printed circuit board and/or the driver IC. Therefore, the printed circuit board and/or the driver IC can be protected from the external impact.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A liquid crystal display comprising:
a liquid crystal display panel;
a driver integrated circuit (IC) configured to supply a driving signal to the liquid crystal display panel;
a printed circuit board configured to transmit the driving signal to the driver IC, wherein a recess is formed in the printed circuit board;
a backlight module formed below the liquid crystal display panel and configured to provide light to the liquid crystal display panel; and
a mold frame configured to receive the backlight module, wherein the mold frame comprises a single protruding portion which extends toward the liquid crystal display panel, wherein the protruding portion of the mold frame is configured to at least partially penetrate the recess of the printed circuit board, wherein the mold frame comprises first and second sides opposing each other, wherein the single protruding portion is integrally formed on the first side, wherein the single protruding portion has a thickness the same as that of the first side of the mold frame, and wherein the thickness is measured in a direction extending from the first side to the second side of the mold frame.

2. The liquid crystal display of claim 1, wherein the mold frame comprises:
   a plurality of supporting portions configured to receive and support a backlight module; and
   an opening portion formed in the first side of the mold frame, wherein the opening portion is connected to at least two of the supporting portions.

3. The liquid crystal display of claim 2, wherein the height of the protruding portion is substantially the same as the height of at least one of the supporting portions.

4. The liquid crystal display of claim 1, wherein the recess includes a hole or a non-linear portion.

5. The liquid crystal display of claim 4, wherein the non-linear portion has a curved shape.

6. The liquid crystal display of claim 4, wherein the non-linear portion has a semi-circular shape.

7. The liquid crystal display of claim 2, wherein the display further comprises a terminal portion interconnecting the driver IC and printed circuit board, wherein the terminal portion is not formed in the region which directly faces the recess of the printed circuit board.

8. The liquid crystal display of claim 2, wherein the height of the protruding portion is greater than the height of the driver IC.

9. The liquid crystal display of claim 2, wherein the printed circuit board is a flexible printed circuit (FPC).

10. A liquid crystal display comprising:
    a liquid crystal display panel;
    a backlight module formed below the liquid crystal display panel and configured to provide light to the liquid crystal display panel; and
    a mold frame configured to receive the backlight module, wherein the mold frame has a plurality of sides comprising first and second sides opposing each other, wherein a first recess is formed in the first side, wherein a single protrusion is integrally formed on the first recess and extends toward the liquid crystal display panel, and wherein the width of the protrusion is significantly less than that of each of the sides,
    wherein the single protrusion has a thickness the same as that of the first side of the mold frame, and wherein the thickness is measured in a direction extending from the first side to the second side of the mold frame.

11. The liquid crystal display of claim 10, wherein the plurality of sides comprise third and fourth sides, and wherein three the second to fourth sides are non-recessed and have substantially the same height.

12. The liquid crystal display of claim 10, wherein the plurality of sides comprise third and fourth sides longer than the first and second sides.

13. The liquid crystal display of claim 10, wherein the height of the protrusion is substantially the same as the height of the sides where the protrusion is not formed.

14. The liquid crystal display of claim 10, further comprising:
    a printed circuit board configured to provide a driving signal to the liquid crystal display panel, wherein a second recess is formed in the printed circuit board, wherein the second recess is significantly less in size than the first recess, and wherein the protrusion of the mold frame is configured to at least partially penetrate the second recess of the printed circuit board.

15. The liquid crystal display of claim 14, wherein the second recess includes a hole or a non-linear portion.

16. The liquid crystal display of claim 15, wherein the non-linear portion has a curved shape.

* * * * *

UNITED STATES PATENT AND TRADEMARK OFFICE
CERTIFICATE OF CORRECTION

| | | |
|---|---|---|
| PATENT NO. | : 8,908,119 B2 | Page 1 of 1 |
| APPLICATION NO. | : 13/051412 | |
| DATED | : December 9, 2014 | |
| INVENTOR(S) | : Ho-Seok Han et al. | |

It is certified that error appears in the above-identified patent and that said Letters Patent is hereby corrected as shown below:

Specification

In column 5 at line 40, Change "that'" to --that--.

Claims

In column 8 at lines 12-13, In Claim 11, change "wherein three" to --wherein--.

Signed and Sealed this
Tenth Day of November, 2015

Michelle K. Lee
*Director of the United States Patent and Trademark Office*